United States Patent [19]

Uehara et al.

[11] Patent Number: 5,014,151
[45] Date of Patent: May 7, 1991

[54] MECHANISM FOR OPENING AND CLOSING A SHUTTER OF MAGNETIC DISC CASSETTE

[75] Inventors: Tsukasa Uehara; Shigeki Okauchi, both of Tokyo, Japan

[73] Assignee: Canon Kabushiki Kaisha, Tokyo, Japan

[21] Appl. No.: 405,559

[22] Filed: Sep. 11, 1989

Related U.S. Application Data

[63] Continuation of Ser. No. 298,285, Jan. 13, 1989, abandoned.

[30] Foreign Application Priority Data

Sep. 9, 1985 [JP] Japan ......................... 60-197660
Sep. 9, 1985 [JP] Japan ......................... 60-197661
Sep. 9, 1985 [JP] Japan ......................... 60-197662

[51] Int. Cl.$^5$ ...................... G11B 23/04; G11B 17/02
[52] U.S. Cl. ..................................................... 360/133
[58] Field of Search ................... 360/133, 97.01, 99.2, 360/99.6, 86

[56] References Cited

FOREIGN PATENT DOCUMENTS

| 0174111 | 3/1986 | European Pat. Off. | 360/133 |
| 0195535 | 9/1986 | European Pat. Off. | 360/133 |
| 55-42311 | 3/1980 | Japan | 360/133 |
| 59-217266 | 12/1984 | Japan | 360/97.01 |
| 60-212861 | 10/1985 | Japan | 360/133 |

Primary Examiner—John H. Wolff
Attorney, Agent, or Firm—Robin, Blecker, Daley & Driscoll

[57] ABSTRACT

A mechanism for opening and closing the shutter of a magnetic disc cassette as the cassette is loaded to and unloaded from a cassette holder. A resilient plate is fixed at one side to the cassette holder and its other or free side is provided with a resilient strip that extends along an adjacent side edge of the cassette holder. This resilient strip is provided with a friction member arranged to engage in frictional contact with the shutter of the cassette. The thickness of the friction member is wider than the thickness of the cassette. A stopper for the free end of the resilient strip is carried on the cassette holder.

10 Claims, 13 Drawing Sheets

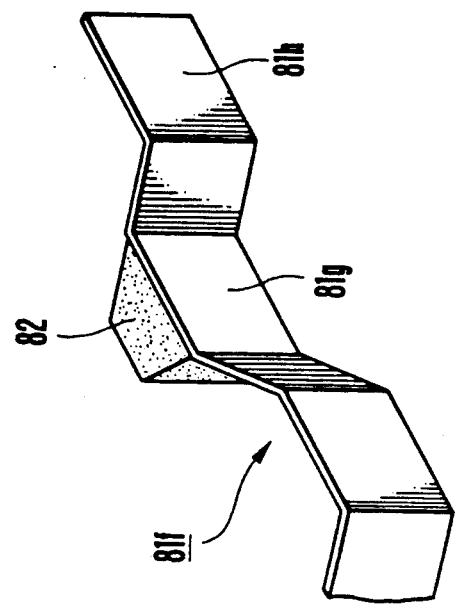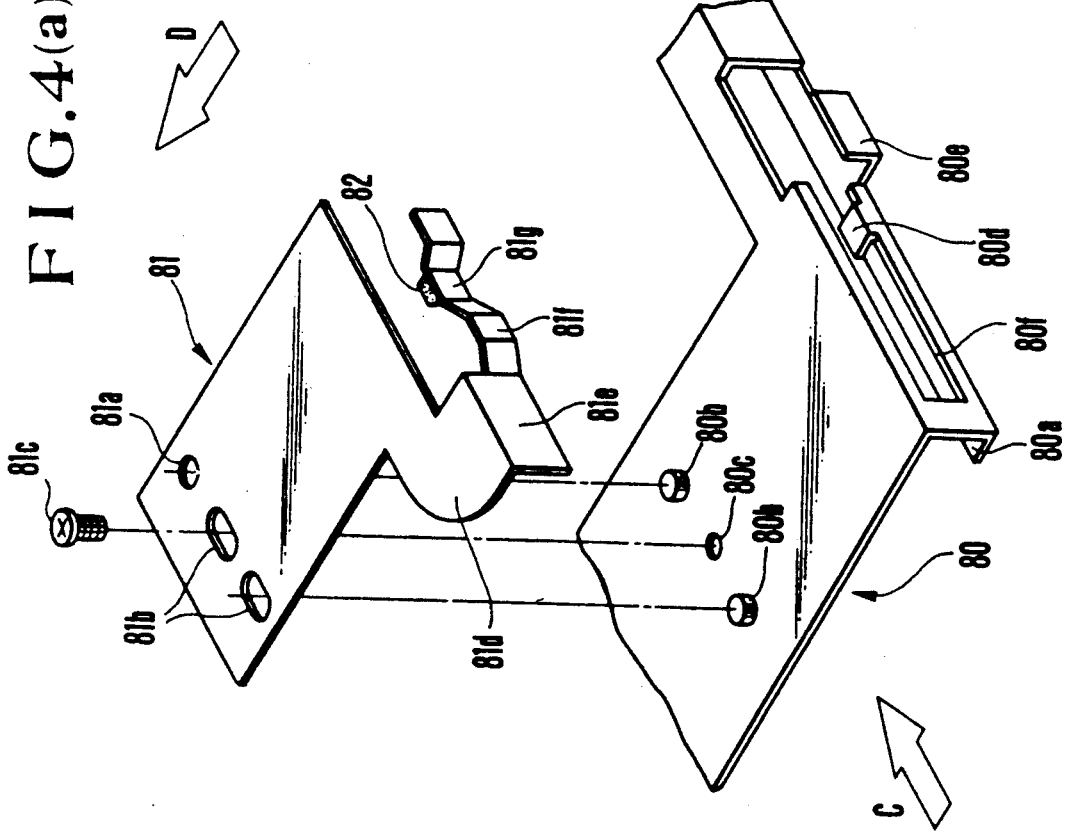

MECHANISM FOR OPENING AND CLOSING A SHUTTER OF MAGNETIC DISC CASSETTE

This application is a continuation of application Ser. No. 298,285, filed Jan. 13, 1989 now abandoned.

BACKGROUND OF THE INVENTION

1. Field of the Invention

This invention relates to mechanisms for opening and closing the shutter of a magnetic disc cassette, and more particularly to such a mechanism which is adapted to be used with a magnetic disc cassette of the type in which the shutter is not given a bias force in a direction to close it.

2. Description of the Related Art

Of the magnetic disc cassettes there is one having a shutter arranged, when the cassette is not in use, to shield an opening portion through which a magnetic head enters the cassette.

The shutters of the magnetic disc cassettes of this kind are divided into two groups, one of which is given a bias force in a direction to close it by a spring or the like, and the other which is given no bias force.

The shutter of the type having no bias spring and the conventional opening and closing mechanism therefor are shown in FIGS. 1 to 3.

Referring to FIG. 1, a magnetic disc 1 is rotatably contained in a cassette 2 made of plastic or the like by molding techniques.

A center hub 3 is fixed to the central portion of the magnetic disc 1, and has its place in an opening portion 5 formed in the central portion of the cassette 2.

A PG pin 4 for indexing a phase of rotation of the disc 1 is buried in the center hub 3.

Opening portions 6 in which a magnetic head and others are to be fitted are formed in the upper and lower side panels of the magnetic disc cassette 2.

These opening portions 6 are opened or closed by a shutter 7 which is slidably fitted in such a way as to clamp the cassette vertically from the side edge thereof.

This shutter is slidable in directions indicated by arrows P and Q.

A rectangular opening portion 7a is formed in the side wall of the shutter 7.

A groove 8 is formed in the one of the sides of the cassette 2 on which the shutter 7 is provided.

Penetration holes 9 and 10 are formed in prescribed positions of the magnetic disc cassette 2 in order to determine the position when it is loaded in the apparatus.

In FIG. 1, an arrow C indicates the direction of loading of the cassette 2.

Mechanism for opening and closing the shutter is shown in FIGS. 2(a) to 2(e).

A member 73 for opening the shutter and a member 74 for closing the shutter are provided on the cassette holder (not shown). The opening member 73 is formed as, for example, a plate spring, and is fixed at its tail end side to the upper surface of the cassette holder. A pawl 73a whose cross-section is of the letter "L" shape is formed on the head end side, pointing downward.

An upward pointing bent portion 73c is formed in a side edge of the opening member 73. A projection 73e is provided on the upper surface of the opening member 73 at a point near the head end side.

The closing member 74 is superimposed on the upper surface of the head end portion of the opening member 73. Its one end is slidably, pivotally mounted on a pin 76 by means of an elongated slot 74b.

A pawl 74a extends downwardly of that portion of the closing member 74 which is adjacent to the elongated slot 74b and is then bent at right angles to the back surface of the opening member 73.

That side of the bent-off portion of the pawl 74a which is nearer to the entrance mouth for the cassette 2 is made as a slanted surface.

The opposite end of the closing member, 74 to that having the slot 74b is bent upward to define a portion 74c.

A spring 77 is tensioned between this bent portion 74c and the bent portion 73c of the opening member 73 to urge the closing member 74 to turn about the pin 76 in a counterclockwise direction as viewed in FIG. 2(a).

A cutout portion 74d is formed in that side edge of the closing member 74 which is nearer to the opening member projection 73e. The counterclockwise movement of the closing member 74 is limited when this cutout portion 74d engages the projection 73e.

That side edge of the cutout portion 74d which is nearer to the bent portion 74c is made as a slanted surface 74e.

The opening and closing mechanism of such construction as described above is mounted on the apparatus in such a condition that the pawls 73a and 74a confront the groove 8 formed in the side wall of the cassette 2.

Also, as shown in FIGS. 3(a) and 3(b), a pawl 72 is formed in the shutter 7 at a position ahead the opening portion 7a as viewed from the direction of loading, and extends toward the groove 8.

Further, the cassette 2 is provided with a lock lever 67 formed by synthetic resin or the like and its root end is fixed to a holding portion 68 formed in the cassette 2.

Also, the opposite end of the lock lever 67 is made the free end. A groove 67a is formed in its external surface. When the pawl 72 is fitted in the groove 67a, the shutter 7 is locked.

Before the cassette is loaded, the pawl 72 lies in the groove 67a of the lock lever 67, so that the shutter is in the locked state and the opening portion 6 is closed.

Next, the opening and closing operation of the shutter 7 will be explained.

At first, the cassette 2 starts to be inserted into the entrance of the apparatus, while the groove 8 is in alignment with the pawls 74a and 73a of the opening and closing mechanism, and, as it continues, the front end 70a of the shutter 7 is approaching the pawls 73a and 74a.

Then, the front end 70a of the shutter 7 contacts the slant surface of the pawl 74a. As it further advances, the closing member 74 is turned about the pin 76 in the direction indicated by arrow F in FIG. 2(a), or in the clockwise direction as viewed in FIG. 2(a), against the bias force of the spring 77.

And, the pawl 74a rides up on the side wall of the shutter 7.

During this operation, the pawl 74a does not contact with the lock lever 67, leaving the shutter 7 locked.

As the inserting of the cassette further advances, the pawl 74a presently enters the opening portion 7a by the force of the spring 77.

Meanwhile, at almost the same time, the pawl 73a of the opening member 73 pushes the lock lever 67 as shown in FIG. 3(c). Thereby the pawl 72 disengages from the groove 67a and the shutter 7 is released from the locking.

Also, at the same time when the locking is released, the pawl 73a contacts with the front end 70a of the shutter 7. After that, as the cassette is inserted, the shutter 7 moved to open position as shown in FIG. 3(d).

Usually, the ceiling portion of the cassette holder is provided with a presser spring for pushing the inserted cassette downward. Also, the height of the interior of the holder is larger than the thickness of the cassette.

The holder moves downward so that the position of the cassette is determined by location pins. In this case, the location pins also determines the height of the cassette.

After the cassette has stopped with its position and height being accurately determined by the location pins, the holder further moves slightly downward to permit the above-described presser spring to act on the cassette so that the accurate adjustment of the position of the cassette is insured.

This is generally called "overcharge". Since the opening and closing mechanism is rigidly mounted on the holder, this overcharging causes the mechanism to move downward along with the holder relative to the cassette which remains stationary. Therefore, the opening and closing pawls, the cassette and the shutter possibly can be damaged by this overcharge action.

For this reason, the opening member is made of a plate spring to allow for vertical deflection of the head end with its tail end fixed to the holder in order to avoid the possibility of such damage.

The closing operation of the shutter is performed in the following way.

When the cassette is pulled from the position of FIG. 3(d), because the pawl 74a lies in the opening portion 7a, and its side edge 7b is in abutting engagement against the side wall of the opening portion 7a, the shutter 7 is left stationary in the latched position, despite the cassette is moving outward. Thus, the shutter becomes closed as the cassette moves outward.

Then, the pawl 73a pushes the lock lever 67 as shown in FIG. 3(c). Then the pawl 72 enters the recess 67a, thereby the shutter is locked.

As the pulling out operation of the cassette further advances, for now, conversely, the closing member is pulled in the same direction as the pulling out direction of the cassette until the right hand end of the slot 74b strikes the pin 76.

During the leftward movement of the closing member 74, it is also turned in a direction indicated by arrow F in FIG. 2(a) by the slant surface 74e sliding on the projection 73e, and the pawl 74a withdraws from the opening portions 7a.

In such a manner, the shutter is opened and closed.

The above described structure uses an unnecessary number of parts, and is heavier than need be and militates against the desirable end of minimizing the size and weight of the opening and closing mechanism.

Also, the provision of a damage avoiding mechanism on the shutter opening and closing mechanism due to the overcharge of the cassette holder (not shown) when the cassette is loaded makes the structure more complicated, and of large size and heavy weight results.

SUMMARY OF THE INVENTION

An object of the present invention is to eliminate the above-described problems. To achieve this, in an embodiment of the invention, the plate spring is fixedly secured at one end to the cassette holder, the opposite or free end of which is formed as a spring strip. This spring strip is provided with a friction member arranged to act on the shutter so that the shutter is opened and closed by frictional force.

When such a feature as described above is employed, it is by the frictional force of the friction member that the opening and closing of the shutter is performed, and, moreover, it is possible for the plate spring and the spring strip to absorb the shift of the relative position of the cassette resulting from the overcharge of the cassette holder.

In another embodiment of the invention, to eliminate the above-described problems, one end of a plate spring is fixed to the cassette holder as a unit, and a spring strip is further formed in its free end to such a shape as to have a bent portion in the middle of the length thereof which is able to enter the opening of the shutter, so that the shutter is opened and closed by this bent portion.

When such a feature as described above is employed, it is by the bent portion that the opening and closing of the shutter is performed, and it is made possible for the plate spring and the spring strip to absorb the shift of the relative position of the cassette when the cassette holder is overcharged.

In still another embodiment of the invention, to eliminate the above-described problems, a member formed by bending a single resilient filament is provided on the cassette holder, and one end of this filament member is formed to a hook-like shape arranged to enter the opening portion of the shutter.

When such a feature is employed, the above-described member comprised of the resilient filament acts on the shutter by the bent hook portion, so that owing to the springing property of that member and the freedom of its mounting state, the shift of the relative position of the cassette can be absorbed when the cassette holder is overcharged.

Other objects and features of the invention will become apparent from the following description and drawings.

BRIEF DESCRIPTION OF THE DRAWINGS

FIGS. 4(a) and 4(b) and FIGS. 5(a) to 5(c) illustrate a first embodiment of the invention, FIG. 4(a) being an exploded perspective view of the main parts, FIG. 4(b) being a perspective view in enlarged scale of the spring strip, and FIGS. 5(a) to 5(c) being sectional views illustrating a manner of operation.

DETAILED DESCRIPTION OF THE PREFERRED EMBODIMENTS

Figure 1:
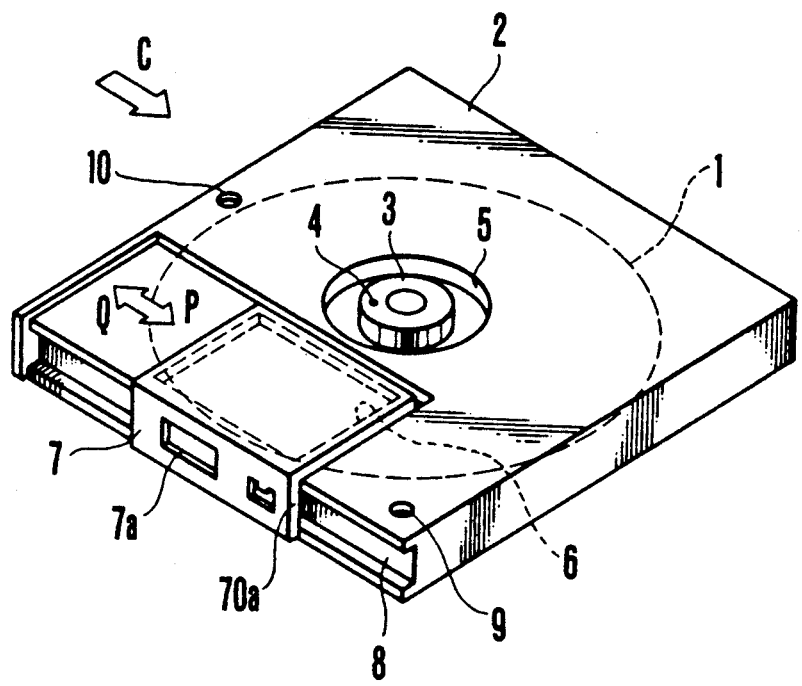
FIG. 1 is a perspective view of a magnetic disc cassette.
Figure 2A:
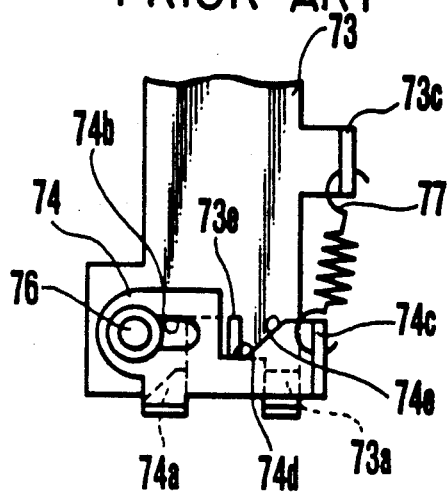
FIGS. 2(a) to 2(e) illustrate a conventional or prior art type opening and closing mechanism, with FIG. 2(a) being a fragmentary top view, FIG. 2(b) being a side elevational view as seen from the right hand of FIG. 2(a), FIG. 2(c) being a side elevational view looked from the left hand side of FIG. 2(a), FIG. 2(d) being a side elevational view as seen from below FIG. 2 (a), and FIG. 2(e) being a side elevational view as seen from above in FIG. 2(a).
Figure 2B:
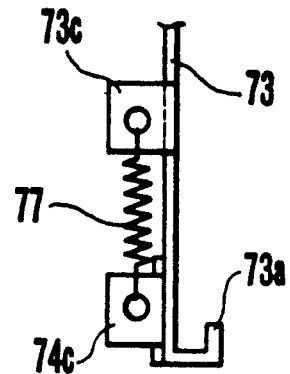
Figure 2C:
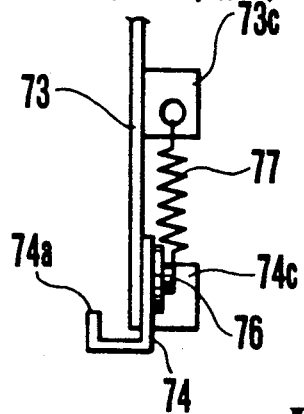
Figure 2D:
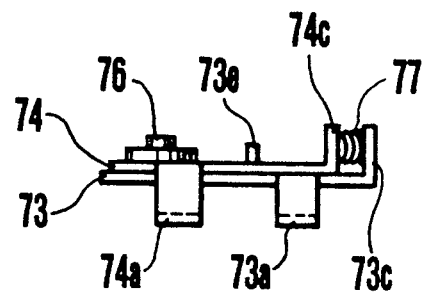
Figure 2E:
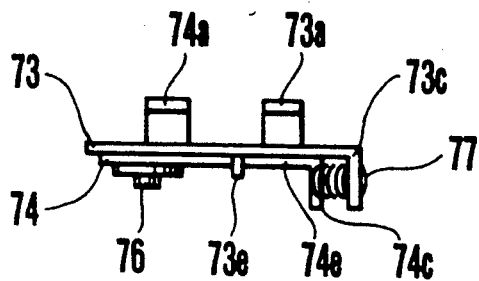

The present invention is next described in detail in connection with embodiments thereof by reference to the drawings.

In FIGS. 4(a) and 4(b) and FIGS. 5(a) to 5(c) there is shown a first embodiment of the invention where the same parts as those shown in FIGS. 1 to 3(d) are denoted by the same reference numerals, and their explanation is omitted.

In FIGS. 4(a) and 4(b), a cassette holder 80 has guide portions 80a formed in either of the right and left hand sides thereof.

A pair of right and left pins 80b and a screw-threaded hole 80c therebetween are provided on and in the upper surface of the cassette holder 80.

Also, the one of the guide portions 80a of the cassette holder 80 which meets the shutter has a pawl 80d and a stopper 80e formed herein.

A plate spring 81 is fixed at one end to the upper side of the cassette holder 80.

In a corresponding position to one of the pins 80b is formed a penetration hole 81a in this plate spring 81, and in corresponding positions to the other pin 80b and the screw-threaded hole 80c are formed long slots 81b.

The reason why such long slots are formed is to absorb the tolerance on the production.

This plate spring is fixed on the cassette holder 80 by a screw 81c.

A projected portion 81d is formed in the free end side of the plate spring 81, and a bent portion 81e is formed in its top end.

This bent portion 81e is positioned outside the guide portion 80a of the cassette holder.

Also, a long spring strip 81f is provided contiguous from the bent portion 81e toward the inserting direction of the cassette.

An inward curved portion 81g is formed in the middle of the spring strip. A friction member 82 made of elastic material such as rubber is fixed to the inner surface of this curved portion 81g.

The right and left hand sides of this friction member 82 are made as inclined surfaces.

Also, a free end 81h of this spring strip 81f is positioned inside the stopper 80e.

Further, the friction member 82 is inserted inside from an opening portion 80f formed in the guide portion 80a of the cassette holder 80.

The thickness of the friction member 82 is larger than the width of the groove 8 formed in the side wall of the cassette 2.

Next, we explain about the opening and closing operation of the shutter with the use of the opening and closing mechanism described above by reference to FIGS. 5(a) to 5(c).

Figure 3A:
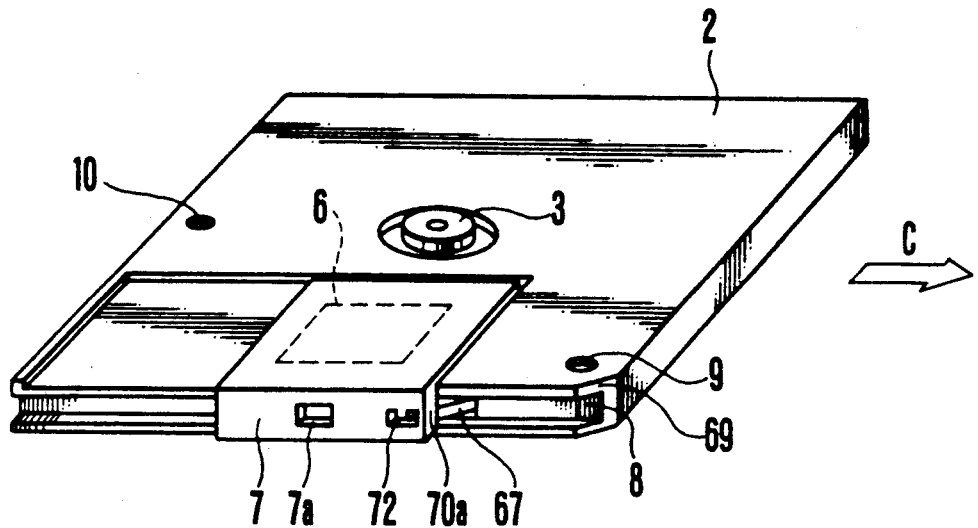
FIGS. 3(a) to 3(d) illustrate a manner in which the prior art mechanism operates.
Figure 3B:
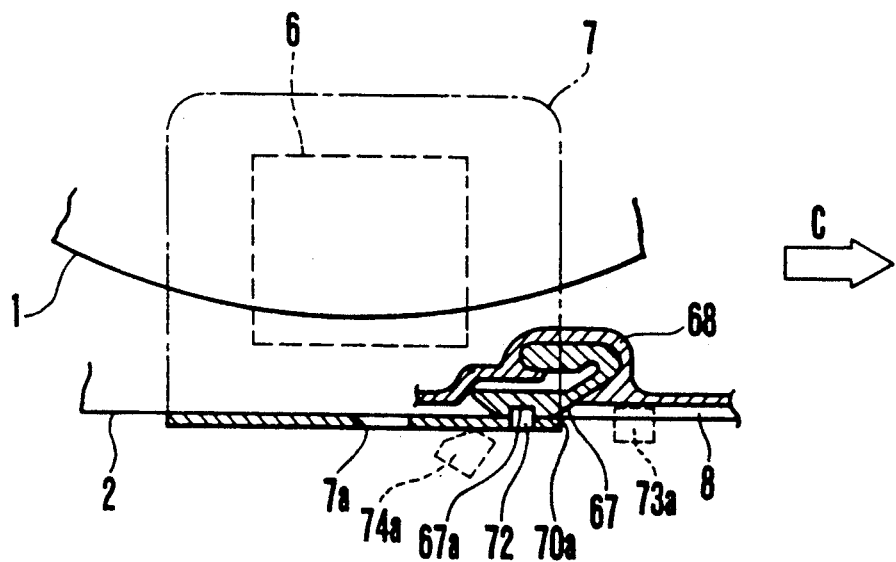
Figure 3C:
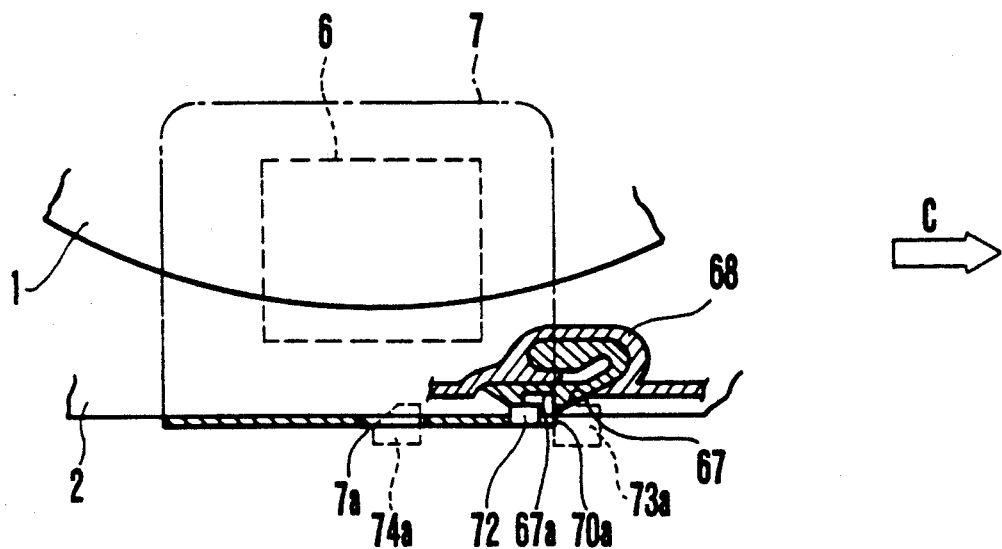
Figure 3D:
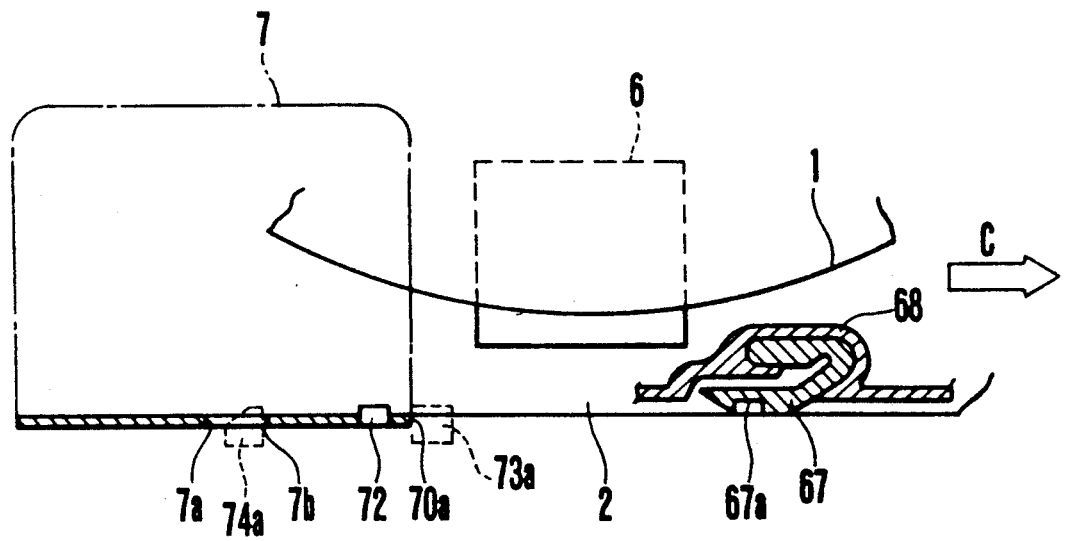

When the cassette with the shutter 7 in the locked state by the lock lever 67 is inserted into the cassette holder 80, the slant surface formed in the front end of the groove 8 of the cassette (see FIG. 3(a)) runs under the friction member 82 so that the friction member 82 rides across the banks of the groove 8.

Hence, the spring strip 81f is pushed outward. But the free end 81h abuts on the inner side of the stopper 80e, causing the friction member 82 to react with a stronger force in a direction indicated by arrow D.

Further insertion of the cassette in this state causes the friction member 82 to rise on the side surface of the shutter 7.

And, when the insertion of the cassette further advances, the pawl 80d starts to push the lock lever 67, and the pawl 72 then slips out from the cutout portion 67a thereby the locking is released.

The release from the locking increases the frictional force of the friction member 82 on the shutter 7 so that the shutter 7 is opened by the friction member 82, regardless of whether or not the shutter 7 is pushed by the pawl 80d.

Since the distance between the friction member 82 and the pawl 80d is shorter than the distance between the opening portion 7a and the front end 70a of the shutter 7, the friction member 82 does not fall in the opening portion 7a.

Therefore, on the shutter 7 side there is no need of the opening portion 7a. But, so long as the above-described dimentional relationship holds, the already available cassette having the opening portion 7a can be used without any alternation.

Figure 5A:
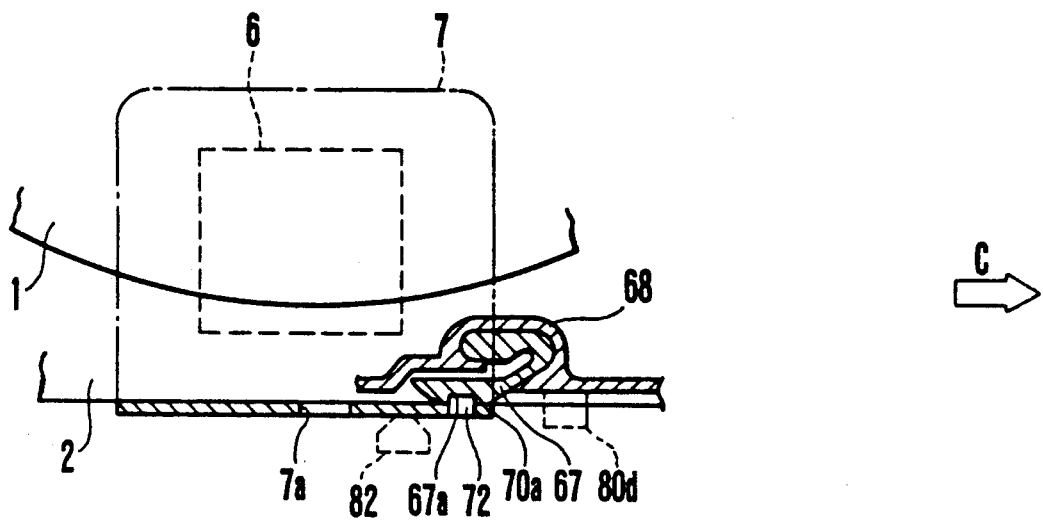
Figure 5B:
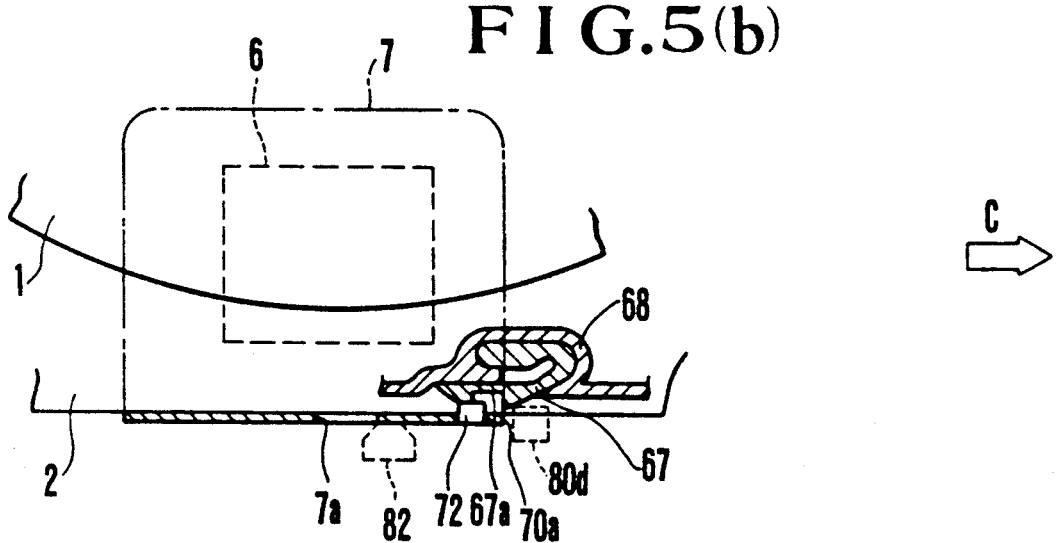
Figure 5C:
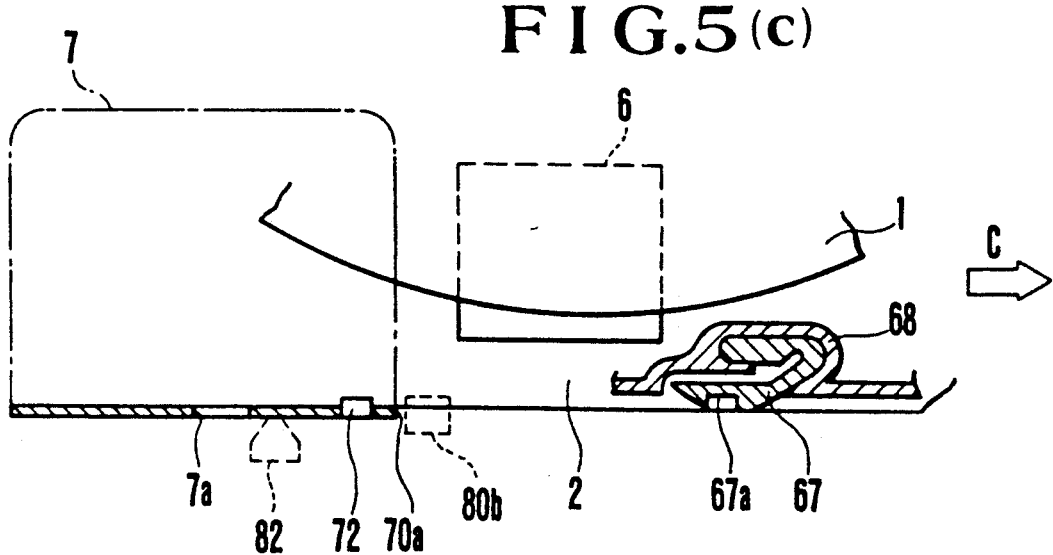

In the position of FIG. 5(c), the shutter is fully opened.

An overcharging starts from this position. Because the opening and closing mechanism is provided on the holder, the overcharging causes the mechanism to move downward along with the holder, leaving the cassette held stationary.

Therefore, in the past, there was a high possibility of damaging the opening and closing pawls, cassette and shutter. In the embodiment of the invention, however, the stress can be adequately absorbed by the elastic deformation of the spring strip extending from the top of the plate spring.

On the other hand, the closing operation of the shutter is just reverse to the above-described operation. But, even at this time, it is by the frictional force of the friction member 82 that the shutter is closed.

And, the pawl 72 drops in the cutout portion 67a of the lock lever 67 and the locking ends. Then the friction member 82 slips down from the shutter 7 to ride on the side surface of the cassette. Finally, the cassette is fully pulled out.

Meanwhile, after the cassette has been fully inserted, the cassette holder is moved downward as a whole in order to locate the cassette in the recording or reproducing position, or a so-called overcharging operation is performed.

At this time, a shifting of the relative position of the cassette takes place within the cassette holder 80. This position shift is absorbed by the flexure of the whole of the plate spring 81.

As is obvious from the above explanation, according to the first embodiment of the invention, a spring strip is provided in a portion of the plate spring on the cassette holder, and a frictional member for action on the shutter is provided on this spring strip. By employing such a structure, it is made possible to open and close the shutter with a high reliability although the mechanism therefor is made of very simple structure by utilizing the frictional force of this friction member and the springing force of this spring strip.

A second embodiment of the invention is next described by reference to FIGS. 6(a) and 6(b) and FIGS. 7(a) to 7(c) where the similar parts to those shown in FIGS. 1 to 5(c) are denoted by the same reference characters, and their explanation is omitted.

Figure 6B:
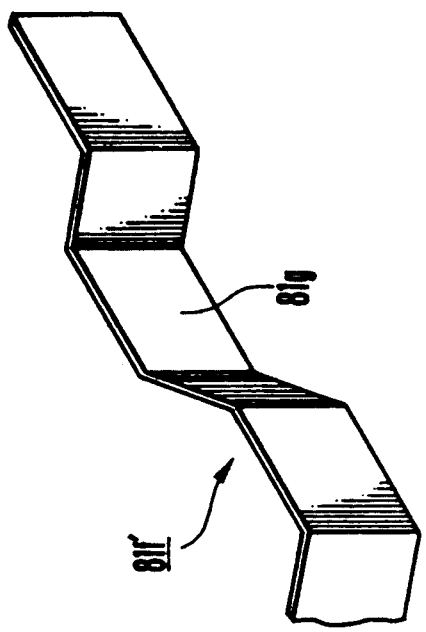
FIGS. 6(a) and 6(b) and FIGS. 7(a) to 7(c) illustrate a second embodiment of the invention, with FIG. 6(a) being an exploded perspective view of the main parts, FIG. 6(b) being a perspective view in enlarged scale of the spring strip, and FIGS. 7(a) to 7(c) explaining the operation.
Figure 6A:
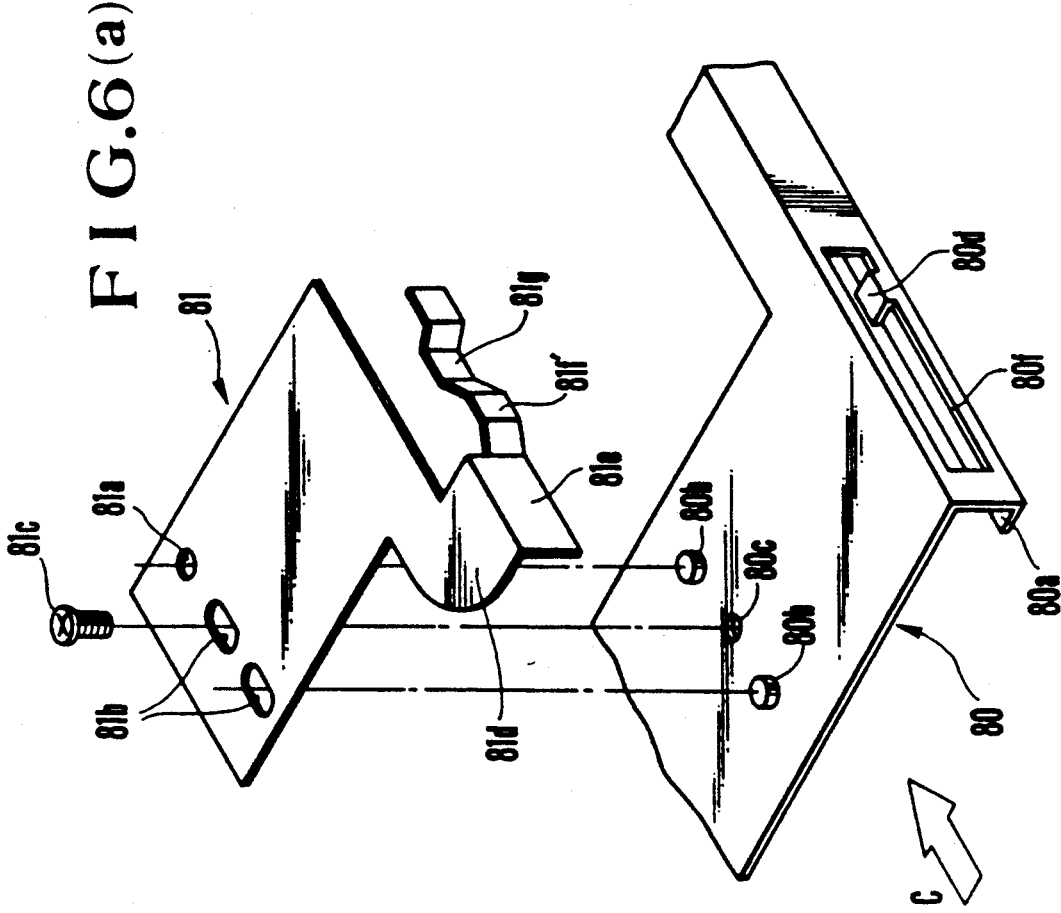

In FIGS. 6(a) and 6(b), guide portions 80a for guiding the cassette are formed in the right and left sides of the cassette holder 80, and a pawl 80d is formed as extends inwardly of the one of the guide portions 80a which meets the shutter. This embodiment is similar in these points to the first embodiment, but there is no stopper 81e.

A trapezoid-shape flexion portion 81g is formed toward the inside in the middle of the spring strip 81f.

This flexion portion 81g is made to project inwardly of the opening portion 80f formed in the guide portion 80a of the cassette holder 80. Also, no friction member is provided on this flexion portion 81g.

The width of the spring strip 81f is shorter than the width of the groove 8 formed in the side wall of the cassette 2.

Next, the opening and closing operation of the shutter with the use of such an opening and closing mechanism as described above will be explained by reference to FIGS. 7(a) to 7(c).

When the cassette 2 with the shutter 7 locked by the lock lever 67 is inserted into the cassette holder 80, the flexion portion 81g fits in the groove 8 of the cassette.

When, in this state, the cassette is further inserted, the flexion portion 81g rides up on the side surface of the shutter 7.

And, when the insertion of the cassette further advances, the pawl 80d starts to push the lock lever 67 and the pawl 72 then gets out of the cutout 67a to release the locking.

At the same time, the flexion portion 81g enters the opening portion 7a of the shutter so that the shutter 7 is restrained by the pawl 80d and the flexion portion 81g, and the cassette only advances, opening the opening portion 6.

Figure 7A:
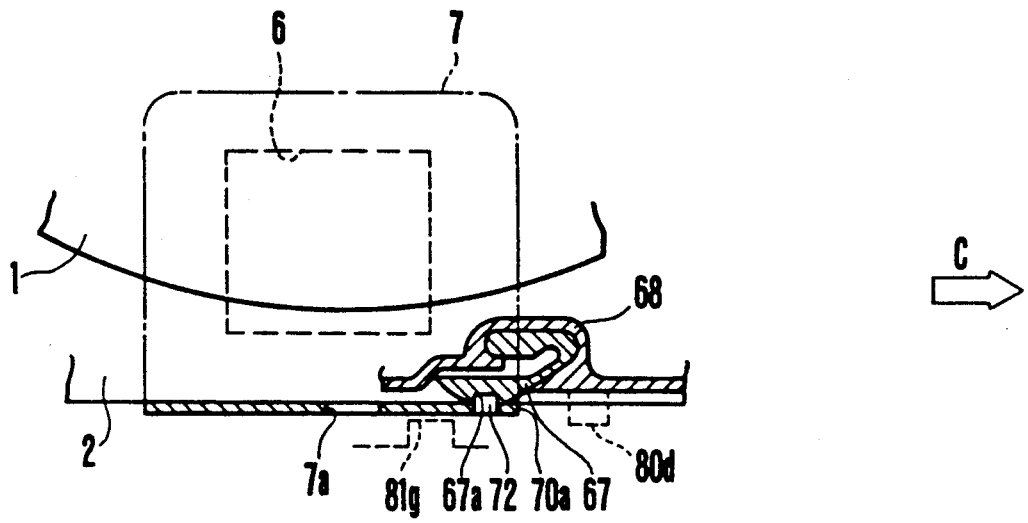
Figure 7B:
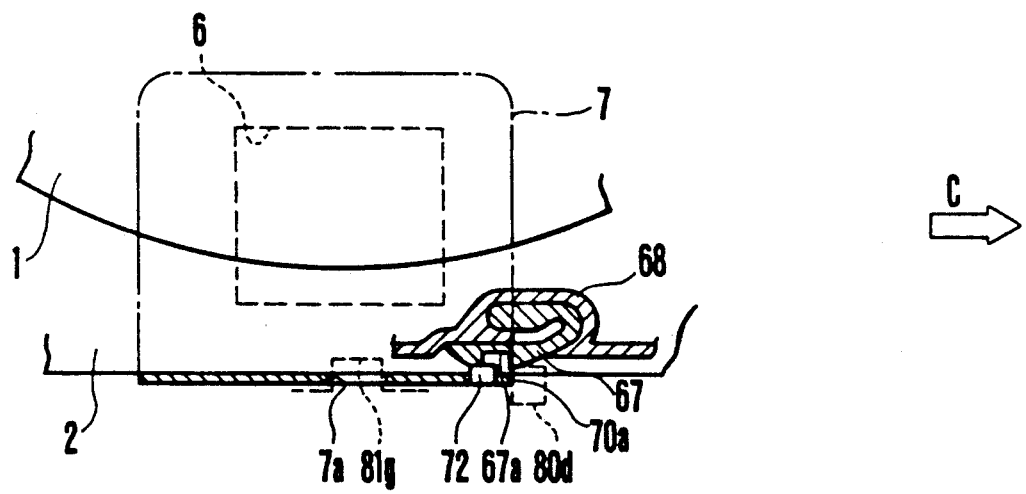
Figure 7C:
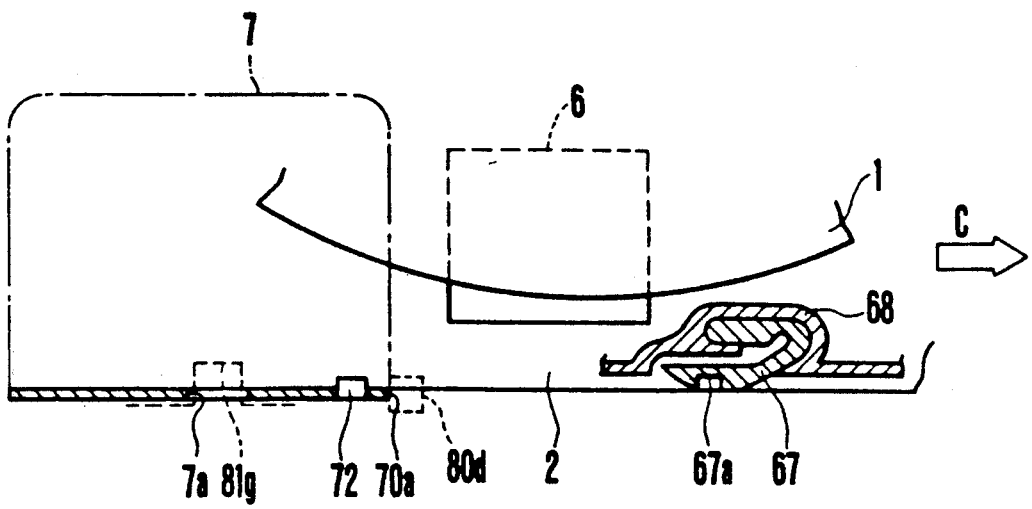

In the position of FIG. 7(c), the opening portion 6 is fully opened.

Meanwhile, the closing operation of the shutter is just reverse to the above-described operation.

And, the pawl 72 is engaged in the cutout portion 67a of the lock lever 67 so that the locking ends. Then, the flexion portion 81g is pushed out of the opening portion 7a, as it bends, and enters the groove 8 of the cassette. Then, the cassette is soon fully pulled out.

As is obvious from the foregoing description, according to the second embodiment of the invention, a spring strip is provided in a portion of the plate spring on the cassette holder, and a flexion portion is provided on this spring strip and arranged to enter the opening portion of the shutter. Because such a structure is employed, the opening and closing of the shutter can be reliably performed by utilizing this flexion portion and the springing force of the spring strip, although the mechanism therefor is very simple in structure. This leads to a possibility of minimizing the size of the apparatus.

A third embodiment of the invention is described by reference to FIGS. 8 to 15, where the same elements to those shown in FIGS. 1 to 7(c) are denoted by the same reference characters.

A pin 181 is provided on the upper surface of the cassette holder 80 at a position near the opening portion 80f. A tap hole 181a is formed in the upper surface on the same axis line as this pin 181 at a prescribed distance therefrom.

A screw portion 183a formed in the lower end portion of a screw 183 is threaded into this tap hole 181.

The screw 183 has a head portion 183b of large diameter, and an engagement portion 183c is formed just under it.

Meanwhile, what is denoted by a numeral 182 is a closing member formed by bending a metal wire.

This closing member 182 is formed to right-and-left symmetry. Spring portions 182a and 182b are formed to almost letter "L" shape in its base portions. Linear portions 182c and 182d are formed on the top side thereof.

And, a pawl 182e is formed in a contiguous state to these linear portions and in an inward direction.

This pawl 182e is fitted in the opening portion 80f.

The spring portions 182a and 182b of the closing member 182 are given such a force to contact on the engagement portion 183c of the screw 183 from the right and left sides, and the distance between the linear portions 182c and 182d is almost equal to the diameter of the pin 181.

Figure 9A:
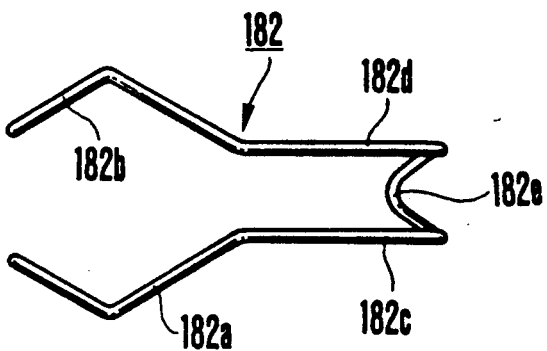
Figure 9B:
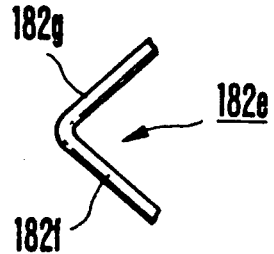

Also, the pawl 182e has inclined sides 182f and 182g in the right and left thereof as shown in FIG. 9(b).

Also, the diameter of the metal wire constituting the closing member 182 is slightly smaller than the thickness portion of the engagement portion 183c.

Next, the operation of this embodiment constructed in such a way as mentioned above will be explained.

Figure 8:
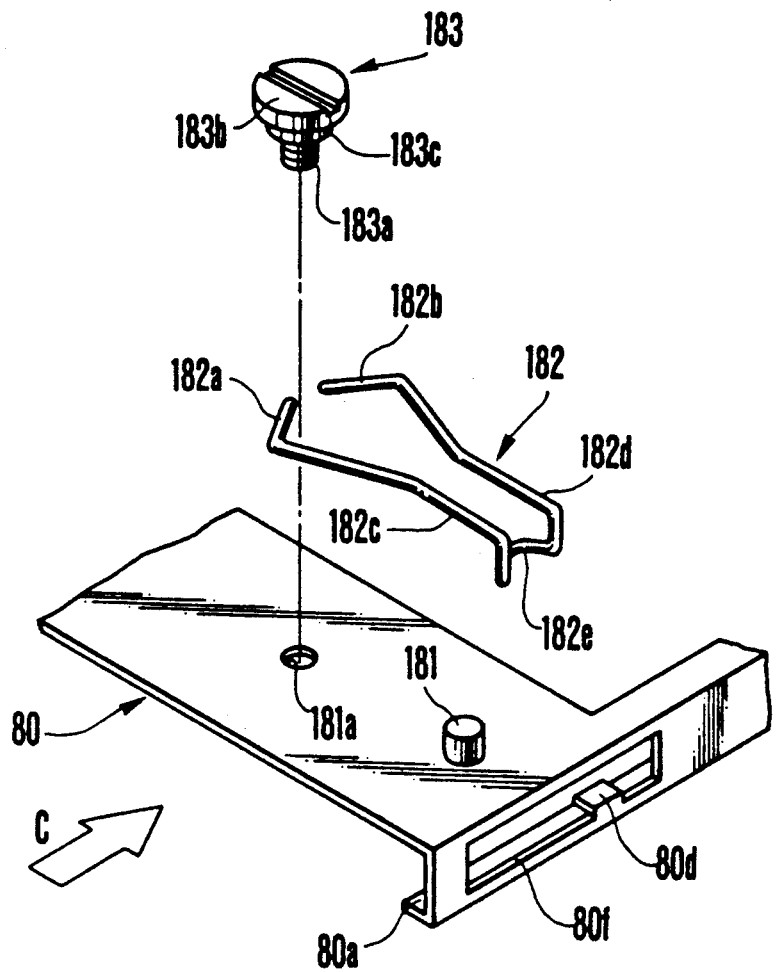
FIGS. 8 to 15 illustrate a third embodiment of the invention, with FIG. 8 being an exploded perspective view of the main parts, FIG. 9(a) being a top view of the closing member, FIG. 9(b) being a fragmentary top view in enlarged scale of a hook-like member used in this embodiment, FIGS. 10 to 15 explaining the operation.

When the cassette 2 is inserted into the cassette holder 80 from the direction indicated by an arrow C in FIG. 8, the pawl 182e for closing and the opening pawl 80d provided on the cassette holder fit into the groove 8 provided in the side wall of the cassette 2.

Figure 10:
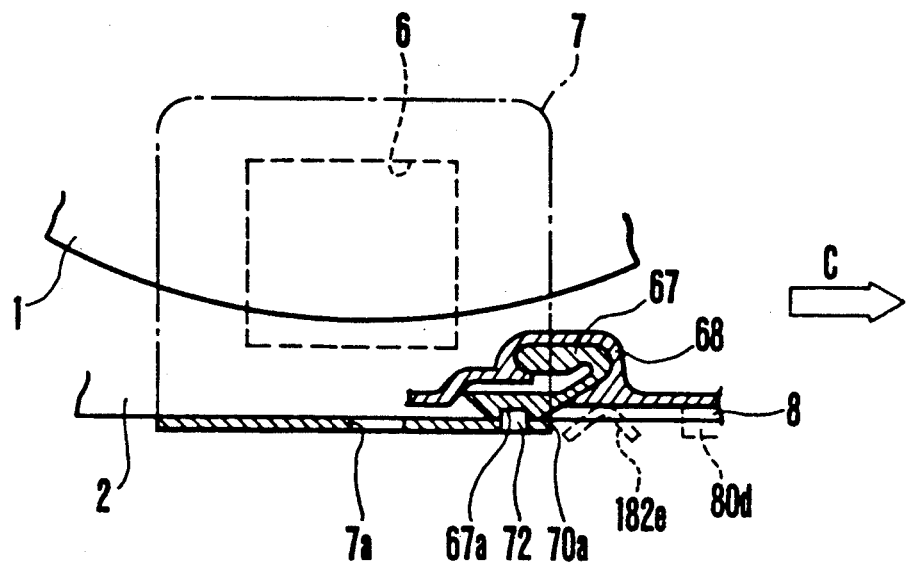
Figure 11:
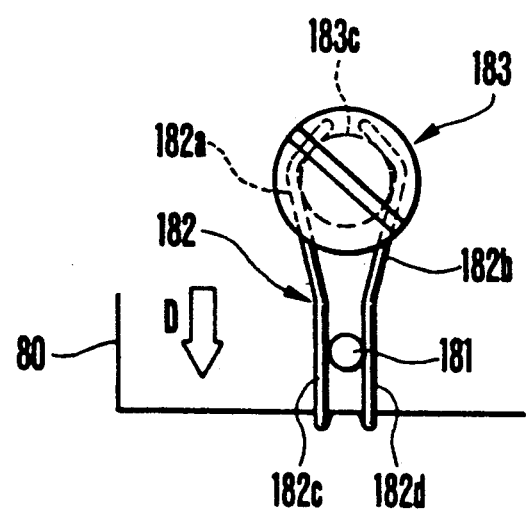

This state is shown in FIGS. 10 and 11.

When the cassette is further inserted, the closing pawl 182e contacts with the lock lever 67 at its inclined surface 182f.

At this time, the closing member 182 is pushed as a whole to a direction indicated by arrow D in FIG. 11 by the lock lever 67, and the pawl 182e passes onto the outer surface of the shutter 7.

Figure 12:
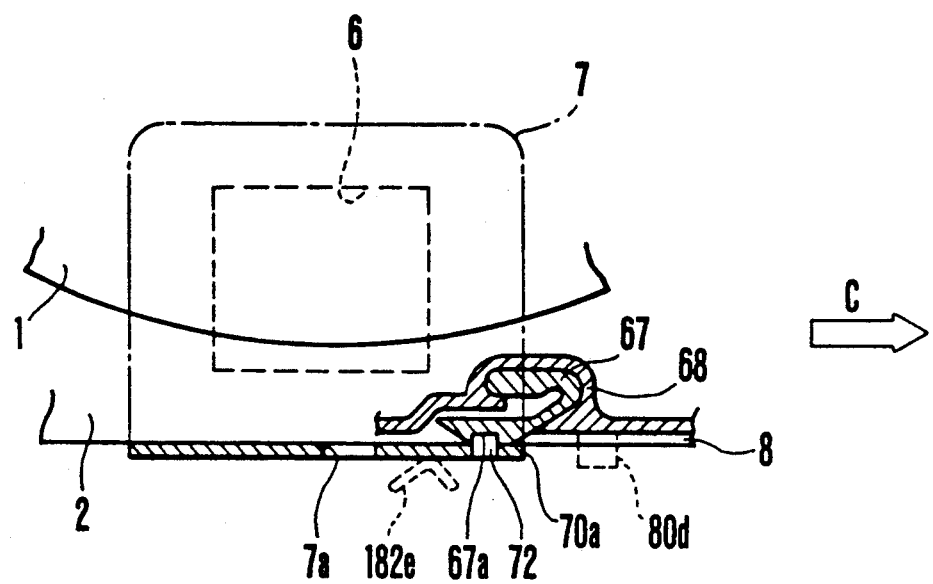
Figure 13:
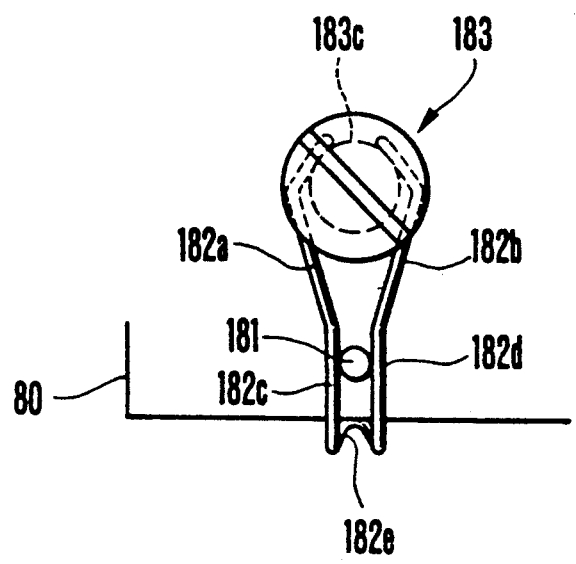

This state is shown in FIGS. 12 and 13.

Since, at this time, the closing member 182 as pushed in the direction of arrow D has moved, the spring portions 182a and 182b become widened the engagement portion 183c as shown in FIG. 13, and, as a result of being pushed wide, a force is exerted so that it tends to return to the initial state.

Therefore, the closing member 182 is urged to return in the opposite direction to that of arrow D.

When the insertion of the cassette further goes on in this state, the pawl 182e confronts the opening portion 7a. At this time, by the force of bringing the closing member 182 backward to the initial state shown in FIG. 11, the pawl 182e enters the opening portion 7a.

Figure 14:
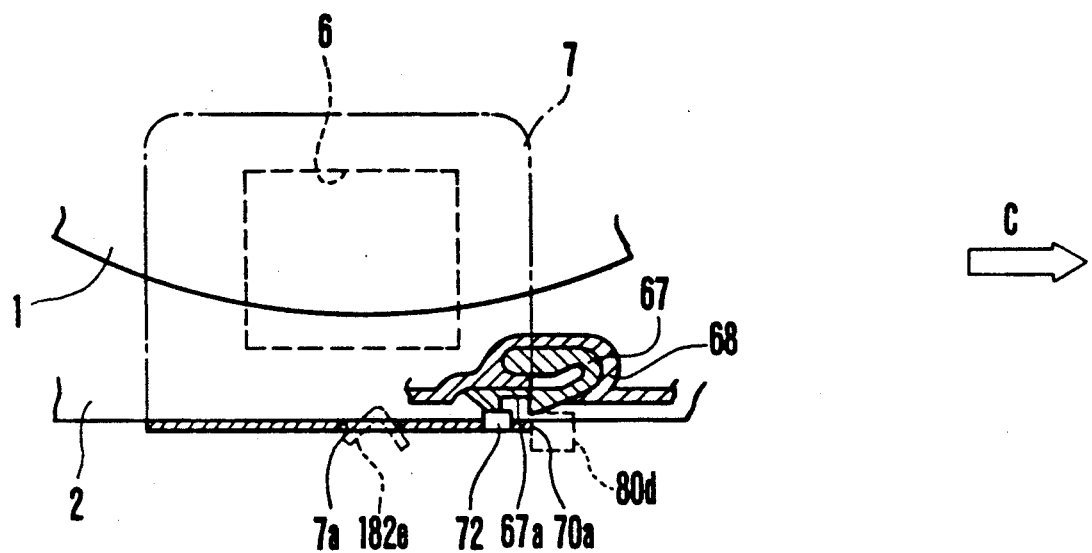
Figure 15:
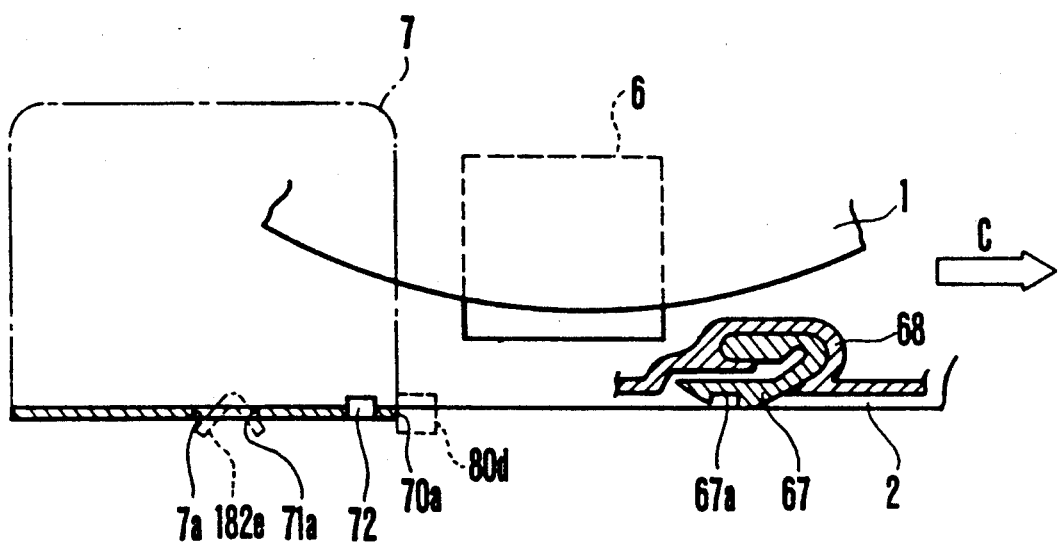

This state is shown in FIG. 14.

At this time, the opening pawl 80d pushes the lock lever 67 to disengage the pawl 72 from the cutout portion 67a, and contacts with the side surface of the shutter 7, starting to open the shutter 7.

After that, the cassette 2 is inserted till the insertion-complete position of the cassette holder 80. Then, in order to move the cassette 2 to the recording or reproducing position, a loading mechanism (not shown) operates so that the cassette holder 80 moves downward along with the cassette.

The downward movement for the loading purpose is an operation of overcharge. At this time, the relative position of the cassette is caused to shift within the cassette holder.

But, despite this position shift takes place, because the diameter of the metal wire constituting the closing member 182 is smaller than the thickness of the engagement portion 183c as has been described above, it moves within the range of the thickness to absorb the position shift of the cassette.

Also, because the closing member 182 itself is formed by the metal wire and has a resilient property, the closing member 182 itself also undergoes elastic deformation, thus being able to absorb the position shift of the cassette when in the overcharging.

Meanwhile, after the recording or reproducing has ended, the cassette 2 moves along with the cassette holder 80 from the recording or reproducing position to a cassette release position. After that, the cassette 2 is moved in the opposite direction to that of arrow C.

Because, at this time, the pawl 182e is fitting in the opening portion 7a of the shutter 7, the shutter 7 is left behind by the pawl 182e in contact with the side wall 71a of the opening portion 7a. Then, the pawl 72 drops in the cutout portion 67a of the lock lever 67 to lock the shutter 7.

And, when the cassette 2 is further moved in the exiting direction, the inclined side 182g of the pawl 182e climbs up the end edge 71a of the opening portion 7a, causing the closing member 182 as a whole to move in the direction of arrow D so that the closing member 182 receives the force of returning to the initial state.

And, when the pawl 182e has run over the outer surface of the shutter 7, the closing member 182 returns to the initial state. Then, the cassette is pulled out.

In such a manner, the use of the closing member 182 of very simple structure enables the opening and closing of the shutter to be performed with a high reliability, and makes it possible to absorb the position shift of the cassette when the cassette holder is over-charged.

Figure 16:
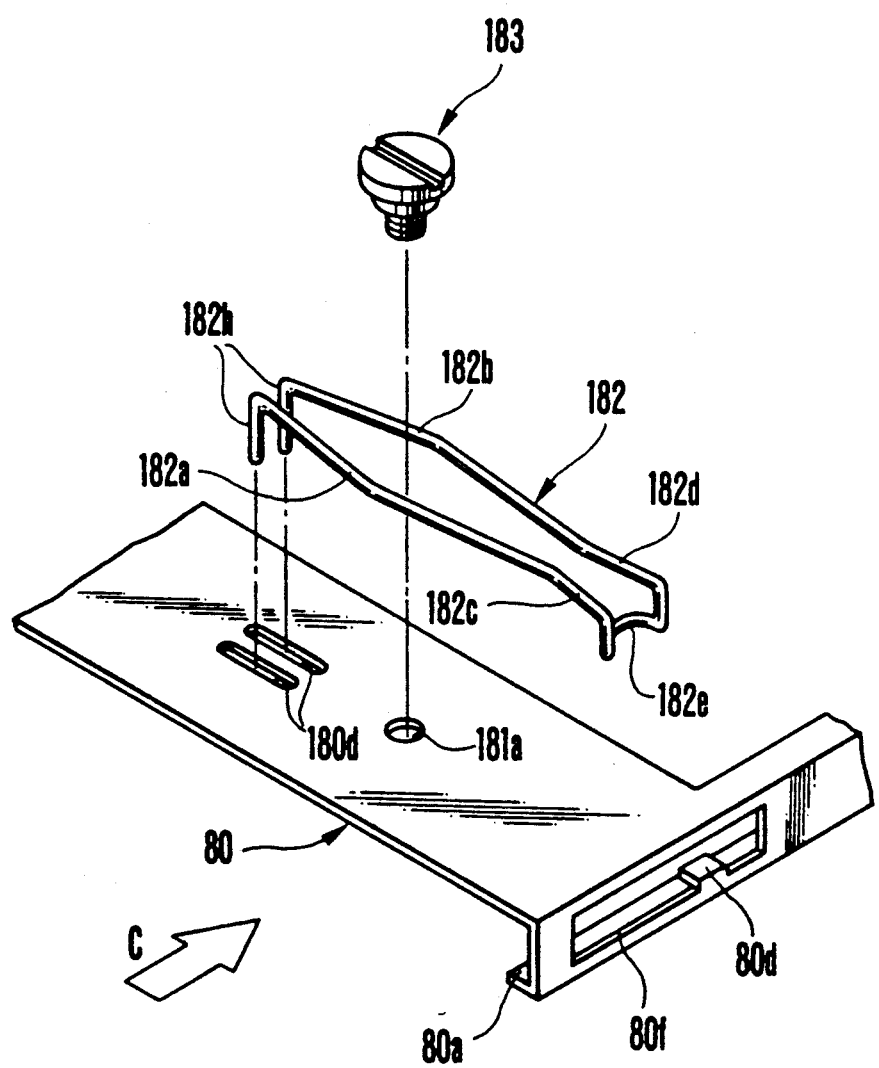
FIG. 16 is an exploded perspective view of the main parts of a fourth embodiment of the invention.

A fourth embodiment of the invention is described by reference to FIG. 16 where the similar parts to those shown in FIGS. 1 to 15 are denoted by the same reference characters.

In this embodiment, a downward bent portion 182h is formed in each of the rear end portions of the spring portions 182a and 182b of the closing member 182, and is slidably fitted in a respective one of two long slots 180d formed in the upper panel of the cassette holder 80 to a direction perpendicular to the direction of insertion of the cassette.

The other parts are similar in construction to those of the third embodiment.

When such a structure is employed, because the bent portions 182h are in the respective different long slots 180d from each other, the closing member 182 is movable within the range of the long slots, but is restrained from rotation.

Therefore, the pin 181 required in the third embodiment can be omitted.

The loading and unloading operation of the cassette is exactly the same as in the third embodiment, and its explanation is omitted.

The opening pawl 80d on the holder 80 may be omitted so that both of the opening and closing of the shutter are performed by the pawl portion 182e of the member 182. That is, in this case, the pawl portion 182e is only required to be formed to such a shape that the lock lever 67 is pushed to release the shutter 7 from the locking, then it engages the right hand end (the top end in the advancing direction) of the shutter 7 to open the latter, then, upon further insertion of the cassette after the opening, is released from engagement with the right hand end, then climbs up on the shutter, and then enters the opening portion 7a (this operation is the same as in the embodiment).

The mounting position of the member 182 may be left unchanged.

Also, the member 182, besides the metal wire material, may be made of synthetic resin by molding techniques.

As is obvious from the foregoing, according to the third and fourth embodiments of the invention, a member formed by bending an elastic wire material is mounted on the cassette holder with some degree of freedom of movement, and a bent engagement portion for fitting engagement in the opening portion of the shutter is formed in the top end of this member. The use of such a structure produces advantages that though the structure is very simple, the required function to the shutter can be performed with high reliability, and that the position shift of the cassette can be absorbed when the cassette holder is overcharged.

What is claimed is:

1. A mechanism for opening and closing a magnetic type disc cassette shutter, comprising:
   (a) a holder for accommodating said cassette, said holder means defining an insertion path along which the cassette is loaded therein and unloaded therefrom, and a support portion for supporting said cassette when loaded in the holder; and
   (b) an elastic member supported at a portion on said holder, and having an extended portion elastically projected into said insertion path, said elastic member elastically abutting on said shutter of said cassette and holding said shutter when said cassette is in said insertion path, urging the shutter in an opening direction as said cassette is inserted into said holder, and urging said shutter in a closing direction as said cassette is pulled out of said holder.

2. A mechanism according to claim 1, wherein said holder has a front opening portion through which said cassette enters and exits, and said insertion path defining means includes side wall portions which function as a supporting portion for supporting said cassette.

3. A mechanism according to claim 2, wherein one of said side wall portions has an elongated slot therein, said elastic means normally projecting through said slot interiorly of the holder.

4. A mechanism according to claim 1, wherein said cassette has a lock member for locking said shutter of said cassette in a closed position, and wherein said holder has a lock release member arranged to release said lock member when said cassette is inserted in said holder.

5. A mechanism for opening and closing the shutter of a magnetic disc cassette, comprising a plate spring having two ends, one of which is fixed to a cassette holder, the other end being free, a spring strip extending from the free end of said plate spring along a side of said cassette inserted into said cassette holder, and an elastic material friction member carried on said spring strip and positioned therewith to engage the shutter and to open said shutter when said cassette is inserted into said holder and to close said shutter when said cassette is withdrawn from said holder by the frictional force according to the movement of said cassette.

6. A cassette holder mechanism of claim 5 in which the cassette has a groove on a side wall of said cassette, the thickness of the friction member relative to the width of said groove being larger than said groove width and in which said shutter is disposed in a slidable manner along said side wall of said cassette.

7. The cassette holder of claim 5 further comprising a stopper carried on the folder adjacent the spring strip to limit spring strip movement when said friction member is engaged with the shutter to thereby increase the frictional force with which the friction member engages said shutter.

8. In a cassette holder for holding a magnetic disc cassette of the type which carries a shutter thereon slideable along a side wall of the cassette between shutter open and shutter closed positions, the shutter having a side wall, said shutter side wall having an opening portion therein, a mechanism for opening and closing said shutter when the cassette is respectively inserted into and withdrawn from the cassette holder, the mechanism comprising:

a plate spring having two ends, one of which is fixed to the cassette holder with the other end being free, an elongated spring strip contiguous with and extending from the free end of said plate spring along a side wall of the cassette holder, said spring strip having a flexure portion formed in a middle length portion thereof projecting toward the shutter side wall and engaging in the opening portion of said shutter so as to hold said shutter relative to the cassette being moved when the cassette is inserted into said holder for opening the shutter and closing the shutter when the cassette is withdrawn from said holder.

9. In a cassette holder for holding a magnetic disc cassette of the type which carries a shutter thereon slideable along a side wall of the cassette between shutter open and shutter closed positions, the shutter having a side wall, said shutter side wall having an opening portion therein, a mechanism for opening and closing said shutter when the cassette is respectively inserted into and withdrawn from the cassette holder, the mechanism comprising:

an elongated shaped elastic wire member having left and right spring portions symmetrically arranged on opposite sides of a post head fixed in said cassette holder, said post head having an engagement part, the spring portions being free at one end of each with the other ends of the portions being in contiguous joinder and defining a pawl member disposed along a side wall of the cassette holder, the free ends of said spring portions being captively but slideably movably retained by the post head engagement part, the pawl being engaged by the shutter when the cassette is inserted into the cassette holder whereby the wire member is slid relative to said post head engagement part in one direction from an initial position so that said pawl can move to a position where said pawl can enter the opening portion of said shutter and hold said shutter relative to the cassette to open the shutter while the cassette is moved to be inserted into said holder, the sliding of said member in said one direction widening said spring portions on said post head engagement part whereby they generate a force tending to slide said member in an opposite direction, said pawl being retained in said shutter opening portion by said force to hold said shutter during withdrawal of said cassette from the cassette holder whereby the shutter is closed, said force returning said member to said initial position thereof following closure of said shutter and further withdrawal movement of said cassette in said cassette holder, the sliding of said member in said one direction elastically deforming said wire spring member itself and said deformation generating said force tending to slide said member in an opposite direction.

10. The cassette holder mechanism of claim 9, in which said wire spring member is provided in such manner that it is bent into two sections and said pawl engaging with the shutter is formed at one end where said bent portion is formed, while at the other end said pawl sandwiches a pin from both sides fixed on the cassette holder so that the pin can move along what is the length direction of said bent wire spring member, further said wire spring member has a slanted portion relative to said length direction formed in a bent shape at a part engaging with said pin, and a force to bias the movement along the lengthwise direction to said initial position is obtained by this slanted portion and the pin.

* * * * *

UNITED STATES PATENT AND TRADEMARK OFFICE
CERTIFICATE OF CORRECTION

PATENT NO. : 5,014,151
DATED : May 7, 1991
INVENTOR(S) : Tsukasa Uehara et al.

It is certified that error appears in the above-identified patent and that said Letters Patent is hereby corrected as shown below:

```
Col. 1, line 46.   Delete " the" first occurrence
Col. 1, line 54.   Change "Mechanism" to -- A mechanism --
Col. 2, line 10.   Delete ","
Col. 2, line 43.   After "shutter" insert -- 7 --
Col. 3, line 3.    Change "when" to -- that --
Col. 3, line 13.   Change "determines" to -- determine --
Col. 3, line 53.   Change "portions" to -- portion --
Col. 4, line 36.   Delete "state"
Col. 4, line 50.   Change "looked" to -- as seen --
Col. 5, line 27.   Delete "the" first occurrence
Col. 7, line 64.   Change "to" to -- as --
Col. 8, line 33.   Change "the opening" to -- opening the --
Col. 8, line 47.   After "widened" insert -- by --
Col. 9, line 5.    After "this" insert -- , --
Col. 10, line 31.  After "holder" insert -- having --
```

UNITED STATES PATENT AND TRADEMARK OFFICE
CERTIFICATE OF CORRECTION

PATENT NO. : 5,014,151

DATED : May 7, 1991

INVENTOR(S) : Taukasa Uehara et al

It is certified that error appears in the above-identified patent and that said Letters Patent is hereby corrected as shown below:

Column 10, line 31, After "holder" insert --having--.

Signed and Sealed this

Ninth Day of March, 1993

Attest:

STEPHEN G. KUNIN

*Attesting Officer*  *Acting Commissioner of Patents and Trademarks*